US010089224B2

(12) United States Patent
Ellerbrock et al.

(10) Patent No.: US 10,089,224 B2
(45) Date of Patent: Oct. 2, 2018

(54) WRITE CACHING USING VOLATILE SHADOW MEMORY (71) Applicant: The Boeing Company, Seal Beach, CA (US)

(72) Inventors: Philip J. Ellerbrock, Cottleville, MO (US); Robert N. Zettwoch, St. Charles, MO (US); Joseph P. Winkelmann, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 1109 days.

(21) Appl. No.: 13/835,191

(22) Filed: Mar. 15, 2013

(65) Prior Publication Data

US 2014/0281130 A1    Sep. 18, 2014

(51) Int. Cl.
*G06F 12/02* (2006.01)
*H04L 12/40* (2006.01)

(52) U.S. Cl.
CPC .... *G06F 12/0246* (2013.01); *H04L 12/40013* (2013.01)

(58) Field of Classification Search
CPC ........... G06F 2212/286; G06F 12/0873; G06F 2212/7203
See application file for complete search history.

(56) References Cited

U.S. PATENT DOCUMENTS 5,363,334 A * 11/1994 Alexander et al. ....... 365/185.04
5,623,604 A *  4/1997 Russell ..................... G06F 8/60
                                                      709/221

(Continued)

FOREIGN PATENT DOCUMENTS

CN   101180617 A   5/2008
EP   2 341 355 A1  7/2011

(Continued)

OTHER PUBLICATIONS

Storr, Phil, Article [online], Dec. 26, 1998 [retrieved on Nov. 20, 2014]. Retrieved from the internet <URL: http://philipstorr.id.au/pcbook/book2/memory.htm>.*

(Continued)

*Primary Examiner* — Ann J Lo
*Assistant Examiner* — Chie Yew
(74) *Attorney, Agent, or Firm* — Womble Bond Dickinson (US) LLP (57) ABSTRACT An apparatus is provided that includes a non-volatile (device storage) memory configured to store data in a plurality of locations. The apparatus also includes a device interface coupled to the non-volatile memory and including a volatile (device storage) shadow memory configured to store an image of the plurality of locations of the non-volatile memory in a corresponding plurality of locations of the volatile shadow memory. The device interface is configured to receive a command across a network bus from a bus controller, and in response thereto, the device interface is configured to write data from the network bus to a location in the non-volatile memory. This write includes the device interface being configured to write the data to the corresponding location in the volatile shadow memory, and thereafter write the data from the corresponding location in the volatile shadow memory to the location in the non-volatile memory.

7 Claims, 5 Drawing Sheets (56) References Cited

U.S. PATENT DOCUMENTS

| | | | |
|---|---|---|---|
| 6,201,740 B1* | 3/2001 | Seyyedy et al. | 365/189.19 |
| 6,708,239 B1 | 3/2004 | Ellerbrock et al. | |
| 6,938,106 B2 | 8/2005 | Ellerbrock et al. | |
| 6,996,708 B1* | 2/2006 | Belknap | 713/2 |
| 7,082,485 B2 | 7/2006 | Ellerbrock et al. | |
| 7,096,285 B2 | 8/2006 | Ellerbrock et al. | |
| 7,111,100 B2 | 9/2006 | Ellerbrock et al. | |
| 7,174,402 B2 | 2/2007 | Ellerbrock et al. | |
| 7,277,970 B2 | 10/2007 | Ellerbrock et al. | |
| 7,346,719 B2 | 3/2008 | Ellerbrock et al. | |
| 7,475,186 B2* | 1/2009 | Diehl | 711/104 |
| 7,552,256 B2 | 6/2009 | Ellerbrock et al. | |
| 7,581,031 B2 | 8/2009 | Konz et al. | |
| 7,630,431 B2 | 12/2009 | Konz et al. | |
| 7,894,562 B2 | 2/2011 | Konz | |
| 2002/0112070 A1 | 8/2002 | Ellerbrock et al. | |
| 2003/0020512 A1* | 1/2003 | Mantey | G06F 15/7867 326/38 |
| 2004/0019754 A1* | 1/2004 | Lin et al. | 711/156 |
| 2006/0053246 A1 | 3/2006 | Lee | |
| 2007/0121631 A1 | 5/2007 | Krikorian et al. | |
| 2008/0082744 A1* | 4/2008 | Nakagawa | 711/113 |
| 2009/0150598 A1* | 6/2009 | Jung et al. | 711/103 |
| 2010/0174847 A1* | 7/2010 | Paley | G06F 12/0246 711/103 |
| 2010/0281010 A1 | 11/2010 | Yamamoto | |
| 2010/0281131 A1 | 11/2010 | HesselBarth et al. | |
| 2010/0306448 A1* | 12/2010 | Chen et al. | 711/103 |
| 2011/0010532 A1* | 1/2011 | Li | 713/2 |
| 2011/0182300 A1 | 7/2011 | Chandhoke | |
| 2012/0004011 A1 | 1/2012 | Chun | |
| 2012/0005452 A1* | 1/2012 | Aral et al. | 711/206 |

FOREIGN PATENT DOCUMENTS

| | | |
|---|---|---|
| JP | 2008-084270 A | 4/2008 |
| JP | 2008-511929 A | 4/2008 |

OTHER PUBLICATIONS

Wikipedia—Expanded Memory, Article [online], Nov. 22, 2011 [retrived on Nov. 21, 2014]. Retrived from the internet <URL: https://web.archive.org/web/20111122204946/http://en.wikipedia.org/wiki/Expanded_memory>.*

Wikipedia—Bank Switching, Article [online], Feb. 13, 2012 [retrieved on Nov. 21, 2014]. Retrieved from the internet <URL: https://web.archive.org/web/20120213203046/http://en.wikipedia.org/wiki/Bank_switching>.*

Hu, J., Xue, C., Tseng, W., He, Y., Qiu, M., and Sha, E., "Reducing Write Activities on Non-volatile Memories in Embedded CMPs via Data Migration and Recomputation." In DAC '10, Jun. 13-18, 2010, Anaheim, California, USA 2010, pp. 350-355, Copyright 2010.

European Search Report dated Apr. 23, 2014 for European Application No. 14 158 734.5, 5 pages.

Chinese Office Action dated Oct. 18, 2017 in Chinese Patent Application No. 2014100987901 filed Mar. 17, 2014.

Notices of Reasons for Rejections for Applcation No. 2014-046264; dated Feb. 20, 2018.

* cited by examiner

WRITE CACHING USING VOLATILE SHADOW MEMORY

TECHNOLOGICAL FIELD

The present disclosure relates generally to network communication and, in particular, to accessing non-volatile memory through a volatile shadow memory.

BACKGROUND

A number of applications such as aerospace, automotive and industrial control utilize network systems such as multimedia entertainment, communications, process control and diagnostic systems. As these systems become more complex, a need arises for additional devices to communicate with one another or a central controller or the like. Network systems have been developed to provide a common communications path between network devices. In aerospace and automotive applications, for example, a network system may be utilized to monitor various components and to collect diagnostic and status information such as that relating to the strain, acceleration, pressure and/or temperature. In another example, a network system may be utilized to support communications and the delivery of multimedia information to occupants in an aerospace or automotive application, or for use in process control applications that could be applied to a system such as a vehicle.

Many traditional systems have long analog wiring that may be susceptible to undesirable noise and signal degradation. Even current networked systems developed to shorten the analog wiring still use complicated protocols requiring high-level processors that limit miniaturization and thus limit device locations which can still result in long analog wiring. Further, high-level protocols may introduce overhead into the messages on a bus that may severely limit the number of data samples that can be transmitted on the bus, the latency at which data can be transmitted or delivered, or the time-determinism of the data sampling and delivery. These networks also generally do not support acquisition and control, and they typically only support networks that extend over relatively short lengths. Further, these networks typically have bulky network device interfaces, slow network data rates and/or a low network device count. Additionally, many computer systems that include digital networks do not operate in a time-deterministic manner, and as such, lack the capability to schedule a trigger command to the network components that repeats or is interpreted and executed with any precision timing.

A protocol and digital network structure have been developed to address a number of shortcomings of conventional digital networks. This protocol and digital network structure are described, for example, in U.S. Pat. No. 6,708,239, entitled: Network Device Interface for Digitally Interfacing Data Channels to a Controller via a Network, issued on Mar. 16, 2004, and U.S. Patent Application Publication No. 2002/0112070, entitled: Bus Controller for Digitally Controlling Remote Devices via a Common Bus, published on Aug. 15, 2002, the contents of both of which are incorporated herein by reference. Although this protocol and network structure offers many advantages over many conventional digital networks, it is typically desirable to make further improvements.

BRIEF SUMMARY

Example implementations of the present disclosure are generally directed to an apparatus and method for accessing non-volatile memory through a volatile shadow memory, which may make stored data available as quickly as a network bus can accept the data. According to one aspect of example implementations, an apparatus is provided that includes a non-volatile (device storage) memory configured to store data in a plurality of locations. The apparatus also includes a device interface coupled to the non-volatile memory and including a volatile shadow memory configured to store an image of the plurality of locations of the non-volatile memory in a corresponding plurality of locations of the volatile shadow memory. In one example, the non-volatile memory may include a base memory and an expanded memory, and the volatile shadow memory may include a base shadow memory and an expanded shadow memory. In this example, the base shadow memory may be configured to store an image of the base memory, and the expanded shadow memory may be configured to store an image of a only selectable subset of the expanded memory.

According to the aforementioned aspect of example implementations, the device interface is couplable to a bus controller via a digital network bus, and configured to receive a command across the network bus from the bus controller, and in response thereto, the device interface is configured to write data from the network bus to a location in the non-volatile memory. This write includes the device interface being configured to write the data to the corresponding location in the volatile shadow memory, and thereafter write the data from the corresponding location in the volatile shadow memory to the location in the non-volatile memory.

In one example, the command is a write command. In this example, the device interface may be configured to write the data from the corresponding location in the volatile shadow memory to the location in the non-volatile memory only after passage of a timeout time without receipt of another write command.

In one example, the device interface is configured to perform a write cycle from the volatile shadow memory to the non-volatile memory, including the device interface being configured to write the data from the corresponding location in the volatile shadow memory to the location in the non-volatile memory. In one example, the device interface may be configured to perform the write cycle for each of the locations of the non-volatile memory for which the volatile shadow memory is configured to store an image in a corresponding location of the volatile shadow memory.

In one example, the write cycle may further include the device interface being configured to check a protected or unprotected status of the location in the non-volatile memory, with the device interface being configured to write the data to the location in the non-volatile memory only in an instance in which the location is an unprotected location.

Additionally or alternatively, for example, the data in the corresponding location in the volatile shadow memory is second data. The write cycle may further include the device interface being configured to read first data from the (unprotected) location in the non-volatile memory and compare the first data with the second data. The device interface may then be configured to write the second data to the (unprotected) location in the non-volatile memory only in an instance in which the first data differs from the second data.

In other aspects of example implementations, a method is provided for accessing non-volatile memory through a volatile shadow memory. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. According to example implementations of the present disclosure, the terms "data," "content," "information" and similar terms may be used interchangeably to refer to data capable of being transmitted, received, operated on, interpreted, stored or the like. Like reference numerals refer to like elements throughout.

At the outset, it is notable that example implementations of the present disclosure may be implemented in any type of network system. The network system may be resident in an aircraft, spacecraft, vehicle, building, factory, or any other packages, structures or environment. As examples, the systems, network devices and methods may be implemented in a network system resident on a rotary-wing aircraft, in which the network includes network devices such as a bus controller and one or more remote devices connected to a common network bus. Each of the remote devices may include or be otherwise coupled to one or more peripherals such as transducers (e.g., sensors, actuators), subsystems or the like, configured to communicate with the bus controller via the common network bus such as to determine performance, status or the like, concerning the various components of the aircraft. The transducers may include, for example, sensors for monitoring strain, acceleration, and pressure of the aircraft's main rotor system.

Example implementations of the present disclosure may also be implemented in a network system in a vehicle such as an automobile in which the network system includes peripherals connected to different components of the vehicle. For example, the peripherals may include sensors for monitoring the throttle position, the oil pressure, the water temperature, the transmission fluid pressure, the seat position, the antilock brake system, the suspension, the passive restraint system and the steering system, to name but a few. In other examples, the peripherals may include an actuator for performing a particular function in response to a command from the bus controller. In the automotive application, for example, the peripherals may include actuators for controlling the throttle position, the anti-lock brake system, the suspension, the passive restraint system and the active suspension system, to name but a few.

Still further, the peripherals may include an audio or video source. For example, the peripherals may include radio receivers, tape cassette players, CD players, MP3 players, cellular telephone receivers or other audio sources for providing audio signals, including, in some instances, streaming audio signals, to the network bus. Correspondingly, the peripherals may include speakers, headphone jacks or the like for receiving audio signals from the network bus and for providing a corresponding audible output. Similarly, peripherals may include a television receiver, a video cassette player, DVD player or other video source for providing video signals, including streaming video signals, to the network bus. Accordingly, peripherals may include a video monitor or the like for receiving the video signals and for displaying images based upon the video signals.

It is also understood that example implementations of the present disclosure may be based on any particular protocol and network structure. In one example, the systems, network devices and methods may be based on the protocol and network structure described in the aforementioned '239 patent and '070 publication. Other related references include U.S. Pat. Nos. 6,938,106; 7,082,485; 7,096,285; 7,111,100; 7,174,402; 7,277,970; 7,346,719; 7,552,256; 7,581,031; 7,630,431 and 7,894,562, the contents of all of which are incorporated by reference.

The aforementioned protocol and network structure may offer many advantages over many conventional digital networks. As explained in the background section, many prior digital networks operate according to complicated protocols that require each network device to have a relatively high-level processor. This, in turn, may increase the cost of the network devices. Further, the high-level protocol may introduce overhead into the messages on the bus that may severely limit the number of data samples that can be transmitted on the bus. These networks also generally do not support both acquisition and control, and they typically only support networks that extend over relatively short lengths. Further, these networks typically have bulky network device interfaces, slow network data rates and/or a low network device count. Additionally, many computer systems that include digital networks do not operate in a time-deterministic manner, and as such, lack the capability to schedule a trigger command to the network components that repeats or is interpreted and executed with any precision timing.

In light of these shortcomings, the digital network structure and protocol of the aforementioned '239 patent and '070 publication use a low-level instruction set allowing less complicated devices to be implemented. The network structure and protocol may also allow for increased data rates and use a command structure that allows for precision timing data acquisition or other actions on the network bus.

Although example implementations of the present disclosure may be based on a variety of network architectures, the functions of example implementations may be added to the existing command structure of the foregoing network structure and protocol. That is, various examples of the present disclosure may be based on the digital network structure and protocol of the '239 patent and '070 publication. Specifically, the commands described below may be implemented with the same or similar structure as those of the protocol, and the communication structure may be the same or similar.

Figure 1:
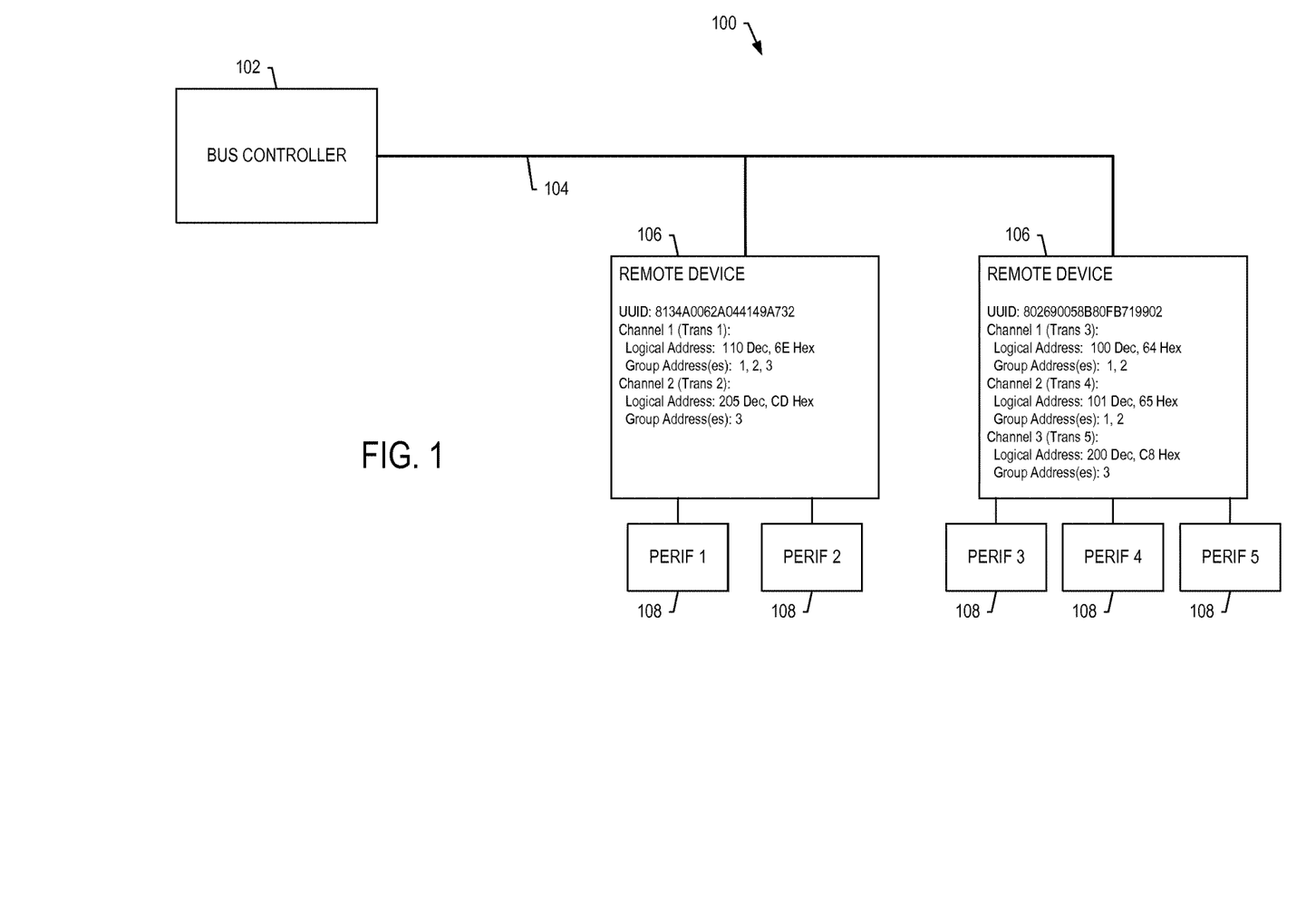
FIG. 1 illustrates a generalized network system in which example implementations of the present disclosure may be implemented.

With reference to FIG. 1, a generalized network system in which example implementations of the present disclosure may be implemented is illustrated. Specifically, FIG. 1 illustrates a network system 100 having a host computer or bus controller 102, a network bus 104, and one or more remote devices 106 (two shown for example) each of which may include or be otherwise coupled to one or more peripherals 108 such as sensors, actuators or the like (five shown for example). In this configuration, the bus controller may provide configuration and control of the network system. The individual remote devices may include assigned identifiers or addresses that uniquely define the remote devices on the bus. In one example, each remote device may include one or more data channels for its respective one or more peripherals, and each data channel may be separately addressed to permit separate communication via each data channel.

In operation, the bus controller 102 may send commands addressed to one or more remote devices 106 via the network bus 104. The remote device(s) designated by the respective address(es) or their peripheral(s) may perform actions associated with the command, and may respond by placing data on the network bus to be sent to either the bus controller or one or more other remote devices. Additionally or alternatively, for example, the remote device(s) may respond to a command, such as a trigger command, by initiating an incoming data measurement in a peripheral such as a sensor, or move a value to an output in a peripheral such as an actuator.

In some examples, a remote device may 106 may provide signal conditioning and may include a built-in device interface for interfacing peripherals with the bus controller 102. In some examples, the device interface (sometimes referred to as a network device interface—NDI) may be used with peripherals that cannot otherwise directly communicate with the bus controller. The device interface may receive and interpret commands from the bus controller and control signal conditioning, such as receiving data from sensors or activating actuators, based on the commands and data from the bus controller.

As suggested above, in various examples, the network system 100 may operate in conjunction with a data protocol that uses a low-level instruction set allowing less-complicated network devices such as the bus controller 102 and/or remote devices 106. This may allow the controller to communicate with one or more remote devices at a time across the network bus 104. Due to the simplicity of the protocol, a network device may not require a high-level processor. Instead, in various examples, the network device may include a hardware-based state machine, which may be implemented as a low-level processor such as an application-specific integrated circuit (ASIC), field-programmable gate array (FPGA) or the like. By using a state machine instead of a micro-controller or processor in various examples, example implementations may permit the simultaneous performance of many processes, which may aid time-deterministic and fast performance of the network device.

Because the bus controller 102 may connect to the remote devices 106 via a common network bus 104, the bus controller may not require dedicated connections to each remote device or their peripherals to control the network system 100. The bus controller may instead use an addressing scheme to assign and control the remote devices and their peripherals. To operate the network system, each remote device or each channel of a remote device may be assigned one or more addresses, including one or more logical addresses, global addresses and/or group addresses. In various examples, one or more of these logical, group and/or global address(es) may be determined according to a process that uses a Universal Unique Identifier (UUID) associated with each remote device. The UUID code is an 80-bit code that is unique to each remote device, and is based on the location and date the device was manufactured. For an example of one such method, see the aforementioned '070 publication.

A logical address may be recognized by a single remote device 106, or a single data channel of a remote device, which the bus controller 102 may use to direct a command (or request) to a particular network device/channel. A global address, on the other hand, may be recognized by all of the remote devices, which the bus controller may use to exchange universal data and commands such as to universally initialize or reset all of the remote devices. A group address may be recognized by a particular group of remote devices on the network which the bus controller may use to exchange group data and commands. For example, the group address scheme may permit the bus controller to set up time-deterministic triggers for groups of remote devices at various sample rates. In another example, the group address scheme may permit groups of remote devices to establish peer-to-peer communications on the network bus 104 without interdiction from the bus controller.

Figure 2:
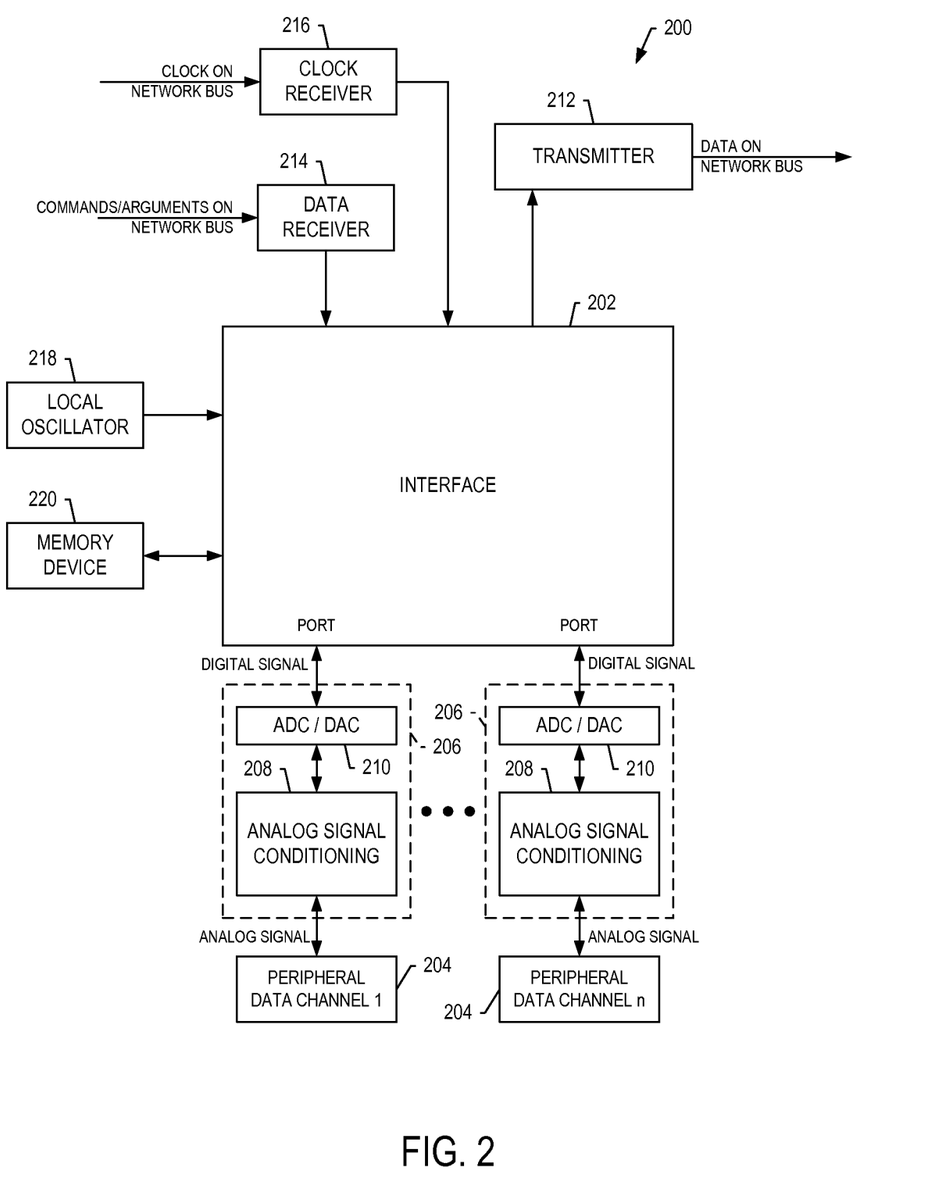
FIG. 2 illustrates a generalized block diagram of a remote device that in various example implementations of the present disclosure may correspond to a remote device illustrated in FIG. 1.

FIG. 2 illustrates a generalized block diagram of a remote device 200 that in various example implementations of the present disclosure may correspond to a remote device 106 illustrated in FIG. 1. As shown, the remote device may include a device interface 202 (e.g., ASIC, FPGA) coupled to and defining data channels 204 for one or more peripherals. The device interface may include various components for performing functions according to example implementations of the present disclosure. For example, the device interface may include ports such as serial or parallel ports that may connect the device interface to respective data channels, and that may be controlled by respective port control logic. The device interface may include various types of volatile memory at least some of which may be composed of one or more data registers, stacks of data registers or the like. The device interface may also include various other registers (e.g., stack-depth register, status register, device inventory register, configuration register, channel-service register, package-definition register), multiplexers (e.g., data-select multiplexer, output-data multiplexer), decoders (e.g., address decoder, command decoder), control logic or the like. Further details regarding a number of suitable components of the device interface may be found in the aforementioned '239 patent.

As shown, the device interface 202 may be coupled to the data channels 204 via respective circuitry 206. For each data channel, this circuitry may include a signal conditioning device 208, such as one or more amplifiers, filters, attenuators or the like, configured to condition analog signals to/from the peripherals. The circuitry may also include an appropriate analog-to-digital converter (ADC) and/or digital-to-analog converter (DAC) 210. In one example, an ADC may be connected between the device interface 202 and a sensor, and may be configured to convert analog signals from the sensor channel into digital data for input to the device interface. Similarly, for example, a DAC may be connected between the device interface and an actuator, and may be configured to convert digital signals from the device interface into analog signals for input to the actuator channel. It is possible that some sensors or actuators could produce or accept digital signals directly so that the circuitry may not require an ADC or DAC.

The device interface 202 may be connected to a network bus such as the network bus 104 of FIG. 1, and may be so connected to enable communication with a bus controller such as the bus controller 102 of FIG. 1. In this regard, the remote device may include a transmitter 212 configured to transmit data to the bus controller, and/or a receiver 214 configured to receive commands and data from the bus controller. The remote device 200 may also include a second receiver 216 configured to receive an optional synchronous clock signal from the bus controller in instances in which the network is operated in a synchronous mode. Likewise, the remote device may include a local oscillator 218, which may support operation of the network in the synchronous mode or an asynchronous mode. Even further, the remote device may include non-volatile memory 220. Although shown as being coupled to the device interface, different implementations of the device interface may instead integrate one or more receivers, transmitters, local oscillator, memory devices or the like.

Figure 3:
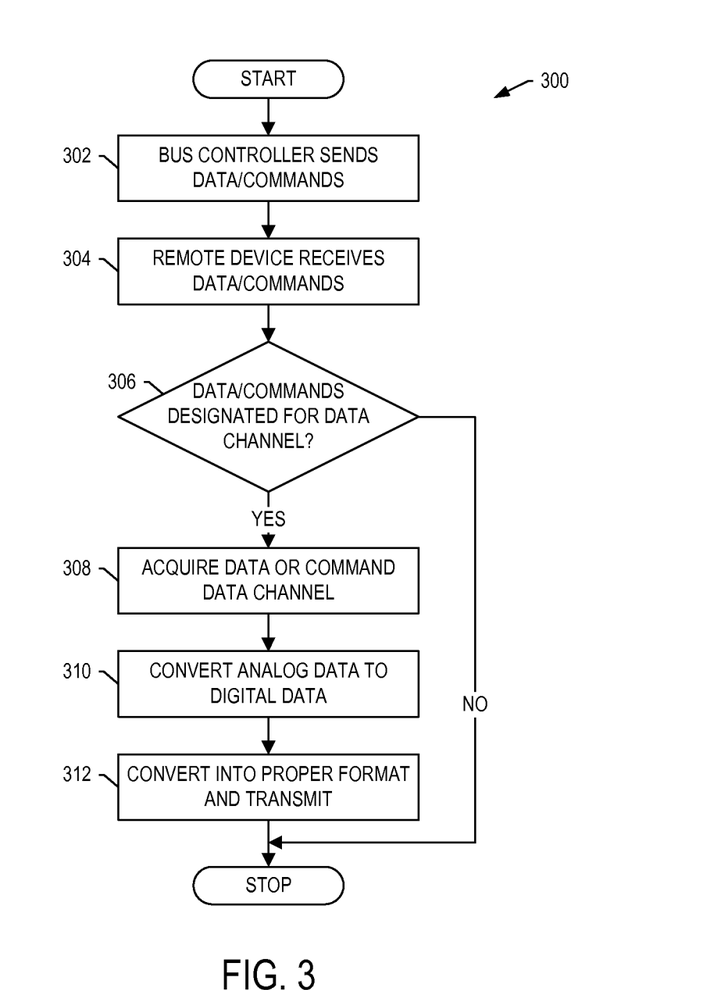
FIG. 3 illustrates various operations in a method according to one example implementation in which remote devices may include or be otherwise coupled to peripherals such as sensors and/or actuators.

FIG. 3 illustrates various operations in a method 300 according to one example implementation in which remote devices 106 (e.g., remote device 200) may include or be otherwise coupled to peripherals such as sensors and/or actuators. As shown in block 302, the method may include the bus controller 102 digitally sending commands and data across the network bus 104 to the remote devices, where the command and data may be designated for one or more data channels on the remote devices. The commands and data may be transmitted across the network using a data protocol, and the remote devices may receive and interpret the data and commands using the structure of the data protocol, as shown in block 304.

In one example, a command word may be reflected in a message that may include a sync portion, message body and parity bit. The message body may include an address field for addressing the command, and an operation code (opcode) field for specifying a command or operation to be performed. Structurally, in one example, the message may include a plurality of bits each of which has a value defined by the transition between first and second states, such as a binary "0" defined by a low-to-high transition, and a binary "1" defined by a high-to-low transition. The remote devices 106 may determine whether the commands and data are designated for any of their data channels, as shown in block 306; and if so, the respective remote device may either acquire data from the designated data channel (if a sensor), or command the data channel to perform a conversion (if an actuator), as shown in block 308. Analog data retrieved from the sensor channels may be converted into digital data, and may then be converted into the proper format according to the data protocol, as shown in block 310. And any appropriate digital data may be transmitted to the controller, as shown in block 312.

Figure 4:
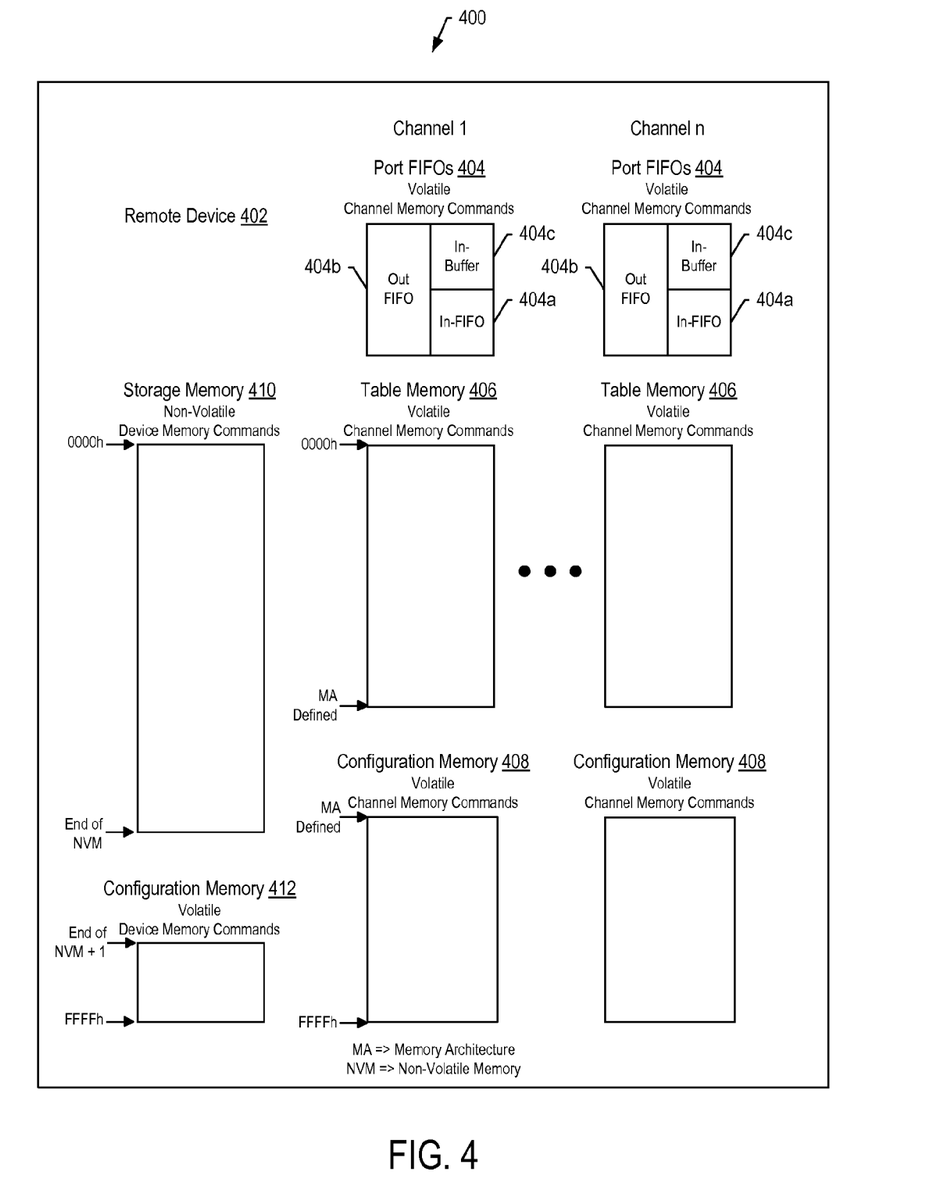
FIG. 4 illustrates the memory architecture of a remote device according to example implementations of the present disclosure.

As suggested in FIG. 2, a remote device 106 may include various types of volatile and non-volatile memory. FIG. 4 illustrates the memory architecture 400 of a remote device 402, which in various examples may correspond to the remote device 200 of FIG. 2. Generally, the remote device may include channel-based memory and device-based memory.

As shown in FIG. 4, for example, the remote device 402 may include channel-based memory such as one or more types of volatile memory for each channel. This channel-based memory may include, for example, first-in-first-out (FIFO) memory 404, and/or random access memory (RAM) such as table memory 406, configuration memory 408 or the like. The remote device may also include device-based memory such as device storage memory 410 with non-volatile memory, and may optionally further include volatile RAM such as device-configuration memory 412. In one example, the volatile memory may be implemented in data register(s) or stack(s) of data registers by the device interface 202, and the non-volatile device storage memory may correspond to non-volatile memory 218.

The FIFO memory 404 may be accessible first-in-first-out whereby the first value placed in the respective memory may be the first value retrieved from it. The table memory 406 and configuration memory 408 of a channel may be accessible using the respective channel's logical address, and in the illustrated example may start at 0000h for each channel. And device storage memory 410 and device-configuration memory 412 may be accessible using any channel address within the remote device 402, and similar to the addressable channel-based table memory and configuration memory, the addressable device-based memory may start at 0000h. That is, more generally, the addressable channel-based memory may start at an address having the same value for each channel, and having the same value as the address at which the addressable device-based memory may start.

Briefly, the FIFO memory 404 and table memory 406 may be used for various purposes such as data acquisition buffering for real-time data streaming ("real-time" defined herein as including "near-real-time"). The FIFO memory may also be used for configuration. The device storage memory 410 may be intended for information storage. The device-configuration memory 412 and configuration memory 408 may be intended for volatile device and channel setup within the remote device 402, and may be populated or otherwise loaded from the device storage memory. In various example implementations, then, the device storage memory and most configuration memory are not intended to be used in real-time data acquisition and control modes.

The FIFO memory 404 may permit the streaming of data to or from a peripheral, and in various examples, may provide a "staging area" between a peripheral data acquisition or control channel and the network bus (e.g., bus 104). Each FIFO memory may include an in-FIFO 404a and out-FIFO 404b, and may further include an in-buffer 404c. The in-FIFO may buffer data between the peripheral and the network bus, while the out-FIFO may buffer data between the network bus and the peripheral. In various examples, either or both of the in-FIFO or out-FIFO may be dual-ported such that data may be read out of or received into the respective FIFO while data is transferred from or to a respective peripheral. Also, in various examples, either or both of the in-FIFO or out-FIFO may be configurable to operate in a direct mode or in a buffered mode.

In the direct mode, the in-FIFO 404a may obtain data directly from the peripheral. In one example, data may be received into the in-buffer 404c and pass directly through to the in-FIFO ready to be retrieved through an appropriate command. The out-FIFO 404b in the direct mode may accept data from the bus and immediately transfer it to the peripheral. In the buffered mode, the in-FIFO 404a and in-buffer 404c may act separately. Data received from the peripheral may be brought into the in-buffer and stored there. Data may then move from the in-buffer to the in-FIFO on an appropriate command. The out-FIFO in the buffered mode may store data from the bus and on command move data out of the out-FIFO to the peripheral.

Similar to the FIFO memory 404, individual channels may be equipped with table memory 406 that contain information that is stored in an addressable manner. This memory is volatile in nature and can be used in applications where values at multiple logical addresses may change dynamically. In various examples, this table memory may be referred to as a current value table (CVT). This data may be updated synchronously or asynchronously. Messages stored within the table memory may span one or more address locations where, in one example, each location may include a 16-bit-wide word. In one example, the table-memory addressing and message size may be defined by the device manufacturer.

The device storage memory 410 may be used by the remote device 402 to store data such as the UUID, protocol version, number of data channels, logical addresses, group masks, device and/or channel configuration information, device storage memory pointers, peripheral boot information, manufacturer-defined device and channel information, and any other data that a manufacturer or user may define. Even further, for example, device storage memory may also be used to store user-defined information such as remote device installation location, calibration data or the like. In various examples, at least a portion of this data may form an electronic data sheet (EDS).

As explained above, the device storage memory 410 may include non-volatile memory. In one example, the device-storage memory may include both a non-volatile device storage memory and volatile device storage shadow memory (sometimes simply referred to as shadow memory) configured to store an image of at least a portion of the non-volatile device storage memory. Similar to other volatile memory, the shadow memory may be implemented in data register(s) or stack(s) of data registers by the device interface 202. In various examples, the device-memory commands may be used to access the volatile shadow memory, and thereby indirectly access the non-volatile device storage memory.

Figure 5:
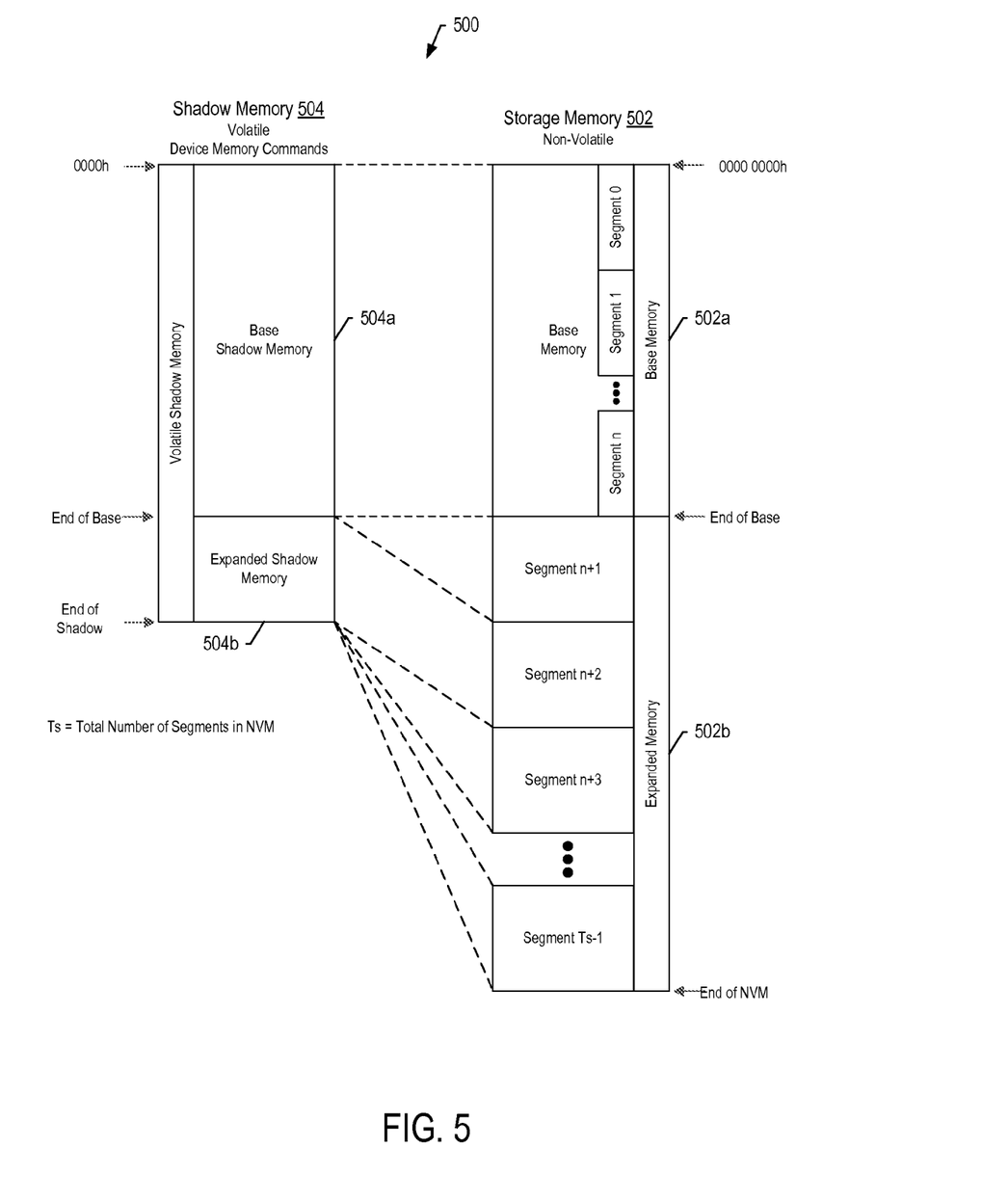
FIG. 5 illustrates a schematic block diagram of a device storage memory according to one example implementation of the present disclosure.

FIG. 5 illustrates a device storage memory 500 that according to one example implementation may correspond to device storage memory 410. As shown, the device storage memory may include a non-volatile device storage memory 502 and volatile device storage shadow memory 504. As also shown, in one example, the non-volatile device storage memory 502 may be partitioned into a number (Ts) of small selectable memory portions (referred to as segments). The first segment through some determined number (n) of segments may form a base memory 502a, and any (if any) remaining segments (Ts−n) may form an expanded memory 502b. The size of the base memory (BMS) may be some integer multiple of the size of each segment (MSS). In this regard, the segment number that starts the expanded memory may be determined by the division of BMS by MSS, which may result in an integer solution.

The base memory may start at device-based memory address 0000h (non-volatile memory address 0000_0000h) and store data such as the UUID, logical addresses, pointers, memory attributes, common configuration, EDSs, calibration coefficients, boot code and the like. In one example, the shadow memory 504 may include a base shadow memory 504a where the base memory 502a of the non-volatile device storage memory 502 may be fully shadowed. Data stored in the shadow memory, and thus the base shadow memory, can thus be available at line-speed.

The expanded memory 502b may store data such as additional configuration information, default settings or the like. Similar to the base memory 502a, the expanded memory may be divided into memory segments whose segment numbers may increment increasingly from the last base memory segment. In one example, the shadow memory 504 may include an expanded shadow memory 504b where the expanded memory may be fully shadowed. In another example, only a selectable portion of the expanded memory, such as a subset (e.g., one) of the expanded memory segments, may be shadowed in the expanded shadow memory at any given time. In this regard, while the base memory segments may be directly loaded into the base shadow memory 504a, subsets of expanded memory segments may be selected by command and loaded into the expanded shadow memory. And again, data stored in the shadow memory, and thus the expanded shadow memory, may be available at line-speed.

In various examples, the non-volatile device storage memory 502 (retains its data when power is removed) may be much slower in operation than the volatile shadow memory 504 (losses its data when power is removed). In these examples, the non-volatile memory may not be capable of performing at line-speed, meaning that it may not be able to keep up with data traffic to or from the network bus (e.g., bus 104). According to example implementations, then, the non-volatile device storage memory may be augmented by the use of the volatile shadow memory that can operate at faster speeds and "stage" data being read or programmed into the non-volatile memory.

Returning to FIG. 4, at power up or reset of the remote device 402, the remote device may perform a boot sequence, which may include a device-initialization phase and device and/or channel configuration-boot phase. During device initialization, data of the device storage memory 410 may be loaded into volatile memory (e.g., table memory 406, configuration memory 408, device-configuration memory 412) or other register space so that it may be accessed in real time or near-real time. In one example, this may include reading from the device storage memory items such as the UUID, implemented mask, logical and group addresses, device storage memory pointers and the like. The boot phase, then, may be the process of configuring the device, channels and respective peripherals for operation.

In accordance with example implementations, the protocol of the network system may include different, distinct sets of commands for the channel-based memory and device-based memory. In one example, the protocol may include a set of channel commands for accessing the channel-based memory of the remote device 402, and a different, distinct set of device-memory commands for accessing the device-based memory of the remote device.

The channel commands may include various FIFO and distinct channel-memory commands through which the FIFO memory 404, table memory 406 and/or configuration memory 408 may be accessible. The channel commands include time-base commands for approximately line-speed movement of data between each channel and its respective channel-based memory. These commands may include, for example, commands designed to get data from sensor ports and provide data to actuator ports, and/or commands designed to provide efficient and "instantaneous" configuration setup of signal conditioners (e.g., signal conditioners 208).

The device-memory commands may include commands through which the device storage memory 410 and device-configuration memory 412 may be accessible. These commands may be intended to provide access to generally static information, operation information, configuration, calibration and catalog information, and/or mapped memory access for future applications where microprocessor memory may be shadowed for access.

Further information regarding various channel commands and device-memory commands will now be described below.

1. Example Channel Command Descriptions

One or more remote devices 402 may be equipped to perform time-deterministic actions for data acquisition or control applications and channel configuration. Such devices may use one of a number of time-base commands to move data into the in-FIFO 404a, out of the out-FIFO 404b, into or out of table memory 406, or into or out of channel configuration memory 408. Each addressable channel within a remote device may contain one or more of the different volatile memory options. Channel commands may be real-time in nature such that the execution time for each command and response may be well understood and may be predicted, defined or the like. The execution time for each channel command and response thereto may be more predictable than that for each device-memory command, which may thereby lead to different timing requirements of the respective commands.

The channel commands may include channel FIFO commands for moving real-time, continuously-acquired data, such as from an ADC or DAC (e.g., ADC/DAC 210) through in-FIFO memory 404a or out-FIFO memory 404b, respectively. These FIFO commands may offer transfer of single data words and/or explicitly defined blocks of data words. The FIFO commands may also permit a remote device 402 to be preconfigured within non-volatile device storage memory 410 that may pre-define a data transfer size using packages. The use of such a package command may eliminate the block size word within read and write commands. The package size may implicitly define the data block size to be moved from in-FIFOs and out-FIFOs.

The channel commands may also include channel-memory commands for moving real-time, continuously-acquired data through table memory 406, or caching configuration information for each channel in suitable configuration memory 408. In this regard, the table memory may be used to hold incoming (data acquisition) or outgoing (control) data in addressable memory space that may be used to move real-time continuously acquired data stored in volatile addressable memory locations.

The configuration memory 408 may be used to immediately program user-configurable attributes of the channel. Changing the values of this memory may be temporary and volatile. The device storage memory 410 may not store configuration settings in the volatile channel memory. But in various examples, any changes in volatile channel memory may need to be made in the equivalent space in the device storage memory, such as in instances in which the settings may be desired after power cycling or reset of the remote device 402. In instances in which channel configuration values are stored in the device storage memory, and a channel boot schedule exists, on power up or reset, the remote device may load the channel configuration memory and configure the channels with values stored within the non-volatile device storage memory. Conversely, in instances in which channel configuration values are not saved in the device storage memory, they may be replaced with values stored in the device storage memory when the remote device is reset or when power is cycled.

1.1. Trigger

A trigger command may be used to precisely latch data in or out of a remote device 402 using a transition within the trigger command word. This feature may be used to establish the global time base.

A remote device channel configured as sensor may utilize the in-FIFO 404a. In one example, conversion signal may be immediately generated when a trigger command is received, which may cause the peripheral to begin a sample conversion. When the sample is generated by the peripheral, the in-FIFO may acquire a preprogrammed amount of data.

A remote device channel configured as an actuator may utilize the out-FIFO 404b. In one example, a conversion signal may be immediately generated when a trigger command is received, which may cause an output component to the peripheral (e.g., DAC 210) to update its output. The out-FIFO may then send out a preprogrammed amount of data. For triggering operations, the out-FIFO may always be in buffered mode (direct mode may move data out to the peripheral such as an actuator as soon as it is received).

1.2. Synchronize

A synchronize command may be used to precisely synchronize remote devices 402 in addition to performing a trigger operation similar to that described above. This command may simultaneously produce a synchronize signal and a trigger signal.

In one example, the synchronize command may be an isochronous operation in which a synchronize-and-trigger event may be generated on the changing center edge of a parity bit in the synchronize command message. In addition to producing the synchronize signal, the synchronize command may have the same or similar timing and behavior within the remote device 402 as the aforementioned trigger command. In one example, a response to the synchronize command with a trigger signal may be mandatory, but depending on the application, the provision or use of a synchronize signal may be optional.

1.3. Get Channel Status

A get-channel-status command may be directed at a single channel through a channel to retrieve the status of the channel. In one example, the status may be reflected in a multi-bit status register (e.g., in device interface 202), and the get-channel-status command may be directed to retrieve the contents of the status register. The contents of the status register may include a plurality of bits some of which may be latched while others may not be latched. In one example, the latched bits may be cleared when the status word is read by this command.

The response to the get-channel-status command may reflect the status of any of a number of different components or operational capabilities of the remote device 402. In the case of a multi-bit status register, for example, each bit may indicate a particular status when set. The register may include bits indicating an error while attempting to access the in-FIFO 404a, out-FIFO 404b or table memory 406, and/or while attempting to write to the respective memory.

The status register may include other bits indicating errors or other notifications regarding the transfer of data into or out of the FIFOs 404a, 404b, such as the premature clearance of an in-FIFO, the absence of requested peripheral data for transfer to the in-FIFO, the interruption or halt to a requested channel-transfer operation, or the like. The register may include a bit representing a master fault flag for the channel, and/or bits indicating an internal logic condition, busy condition or the like. The register may include bits tied to respective external peripheral devices and that indicate the status of the respective devices. The register may include bits indicating a channel in test mode, or indicating the occurrence of an error in a channel built-in-test (BIT). In even further example in which the channel may be enabled to carry out a macro process, the register may include a bit indicating that the process is enabled.

1.4. Set Channel Service

A set-channel-service command may be used to perform output type discrete service and opcode operations, such as through each channel's channel-service register (e.g., in device interface 202). In various examples, the set-channel-service command may include a portion (e.g., least-significant—LS—byte) for indicating opcode operations, and another portion (e.g., most-significant—MS—byte) for indicating service operations.

The channel-service opcodes may temporarily set the remote device 402 to a test mode, such as BIT or another test mode. The channel-service opcodes may override another operational mode of the remote device until it is generally reset or reset to its normal operational mode (e.g., through another opcode), or power is cycled. Some of these test modes may not apply to all devices. If the channel does not support an opcode, it may be ignored.

The portion of the set-channel-service command for indicating service operations may include a channel-service reset bit field that may be used to reset volatile memory and/or various registers within the channel. In one example, the field may be a multi-bit field each bit of which may be set to select memory to reset or otherwise clear. The field may include bits to clear a channel's in-FIFO 404a and/or out-FIFO 404b, and in various examples may also clear any other buffers associated with respective input and/or output ports. The field may also include a bit to clear a channel's table memory 406, such as by clearing to 0000h the contents of the selected memory, and which in various examples may also clear any accumulators or reset any timers. This may reset only the selected memory, and may not affect the contents of the configuration memory 408. The remote device 402 may be ready to accept new commands immediately after receiving this command. Some selections may not be supported. If the channel does not support a bit selection, it may be ignored.

1.5. Get In-FIFO/Out-FIFO Count

A get-in-FIFO-count command may be used to determine the number of words contained in the in-FIFO 404a in buffered mode, or the in-buffer 404c and in-FIFO in direct mode. Similarly, a get-out-FIFO-count command may be used to determine the number of words contained in the out-FIFO 404b. The commands may cause the remote device 402 to return a multi-bit value representing the number of words contained in respective ones of the in-FIFO or out-FIFO.

1.6. Peripheral to/from FIFO Transfer

A FIFO-transfer command may be used to move data from the out-FIFO 404b to a remote device's peripheral, and/or from the peripheral to the in-buffer 404c. The command may include respective arguments specifying a number of bytes to be transferred from the out-FIFO to the peripheral, and/or the number of bytes to be transferred from the peripheral to the in-buffer. Either of the arguments, though, may be zero. In various examples, although the command may specify a number of bytes, data may be transferred in word boundaries. For example, when there are an odd number of bytes, the last word sent from the out-FIFO or received to the in-buffer 404c may contain a valid lower byte and invalid upper byte.

The remote device 402 receiving this command may respond in a number of different manners for a number of different conditions. For example, for a transfer from the out-FIFO 404b, the remote device may transfer the specified number of bytes as long as there are words in the out-FIFO to transfer. If the out-FIFO exhausts its contents before the defined transfer is complete, the command may abort. If the in-buffer argument is greater than the number of bytes that the in-FIFO 404a may be capable of producing in a single request, then the max number of bytes the FIFO can produce may be transferred to the in-buffer 404c and the remaining request may be ignored. This may avoid a fault and ensure that only intentional data is output to the peripheral.

The in-FIFO 404a may operate in the direct mode when the in-buffer argument is greater than zero, and the out-FIFO 404b may be set to the buffer mode when the out-FIFO argument is greater than zero. In either instance, the direct/buffer mode operation may occur regardless of the channel's setting, although it may be temporary if different from the channel's configured-setting.

When the out-FIFO argument is greater than the in-buffer argument, the in-buffer contents may be received starting after the difference between the arguments. When the out-FIFO argument is less than or equal to the in-buffer argument, on the other hand, the transfers may begin at the same time. The FIFO 404 may insert a predefined value if output data is still required beyond that specified, such as for a full-duplex FIFO.

1.7. Read In-FIFO Word/Block/Package

These read-in-FIFO commands may be used to read a data word, block of words or predefined package of a number of words from a remote device 402 channel's in-FIFO 404a, and transmit the word(s) onto the bus (e.g., bus 104). In one example, the number of data words may be specified in the command. And in one example in the context of a package of words, the number of data words in a package may be predefined within a package-definition register of the remote device (e.g., in device interface 202).

1.8. Write Out-FIFO Word/Block/Package

These write-out-FIFO commands may be used to receive a data word, block of words or predefined package of words from the bus (e.g., bus 104), and write the word(s) to the out-FIFO 404b. Similar to the read command, in one example, the number of data words may be specified in the command. Likewise, for example, the number of data words in a package may be predefined within the package-definition register of the remote device.

1.9. Write Out-FIFO Word/Block/Package while Acquire

These write-out-FIFO-while-acquire commands may be used to receive a data word, block of words or predefined package of words from the bus (e.g., bus 104), and write the word(s) to the out-FIFO 404b. The out-FIFO may then send the data directly to the peripheral while acquiring one data word immediately into the in-FIFO 404a from the peripheral. Similar to before, in one example, the number of data words may be specified in the command or, for a package, may be predefined within the package-definition register. The in-FIFO and out-FIFO may be set to either direct or buffered mode. But these commands may be intended for use when the out-FIFO is set to direct mode. In one example, then, the remote device 402 may treat the command as a write-out-FIFO command if it receives the command while the out-FIFO is in buffered mode.

1.10. Read/Write Channel Memory Block

These commands may be used to read or write a block of data words from or to a device's channel memory. The commands may include an argument indicating a memory location pointer value, and the read/write operation may start at the position in channel memory indicated by the respective argument. The commands may include an additional data argument that may tell the remote device 402 how many data words are to be read from its memory and transmitted on the bus (e.g., bus 104), or how many data words are to be received from the bus and written into its memory. The remote device may read/write the data starting at the passed pointer value, and sequentially read/write the incrementing addresses.

2. Example Device-Memory Command Descriptions

In addition to channel commands, the protocol may include device-memory commands. These commands may include commands for addressing device-based memory used to configure the remote device 402. As indicated above, in various examples, this memory space may not be intended for real-time data acquisition operations.

The device-memory commands generally address non-volatile device storage memory 410 used for storage of configuration and control information for both an initialization process and run-time operations, but may also address volatile device-configuration memory 412. As suggested above, the device storage memory may include user-provided information and manufacturer-stored information. User-provided information may include, for example, information specific to the application of the remote device at a device and channel level, and may include channel parameter information, calibration coefficients and the like. The manufacturer-stored information may include, for example, boot routines, device-specific adjustment coefficients, other user-unchangeable information and the like. In various examples, space within the device storage memory may be reserved for non-volatile storage of the volatile device and channel configuration memory.

The ability to successfully read and write to memory locations may be dependent on the hardware implementation of the remote device 402. In various examples, manufacturer's memory-access time through a device interface (e.g., in device interface 202), which may be necessary for both reading from and writing to non-volatile memory, may be specified. In some examples, portions of the non-volatile device storage memory 502 may be shadowed in an addressable volatile shadow memory 504. Device-memory commands may then access this volatile memory space that is an image of the non-volatile space.

The remote device 402 of example implementations may support large or limited volatile memory space that may be fully or only partially shadowed. In some examples, the device storage memory 500 may be partitioned into memory segments, which may be divided into base and expanded memory 502a, 502b. The entire base memory in some examples may be loaded into directly-addressable base shadow memory 504a, while only a subset of the segments of the expanded memory may be similarly loaded into directly-addressable expanded shadow memory 504b. The device storage memory may therefore accommodate greater non-volatile memory (a more limited volatile memory).

2.1. Set/Get Expanded Memory Segment Pointer

These segment-pointer commands may set or read a multi-bit device memory segment pointer within a remote device 402. For a set command, one or more remote devices may respond to this command by loading their respective expanded shadow memory 504b with the contents of an indicated segment of expanded memory 502b. Other device memory commands may then read or write into the respective currently-loaded segment. For a get (read) command, the remote device may respond with the currently-loaded segment from its expanded shadow memory.

2.2. Get Device Memory Pointer

This device-memory-pointer command may read a multi-bit device memory address pointer within a remote device 402. One or more remote devices may respond to this command with the current location of their respective device memory address pointer(s).

2.3. Read/Write Device Memory Block

These commands may be used to read or write a block of data words from or to device storage memory 410. The commands may include an argument indicating a memory location pointer value, and the read/write operation may start at the position in device storage memory indicated by the respective argument. The commands may include an additional data argument that may tell the remote device 402 how many data words are to be read from its device storage memory and transmitted on the bus (e.g., bus 104), or how many data words are to be received from the bus and written into its device storage memory. The remote device may read/write the data starting at the passed pointer value, and sequentially read/write the incrementing addresses.

2.4. Set Memory Protection Mode

This command may be used to unlock or lock sections of device storage memory 410. The command may include an argument including an appropriate unlock code.

Again turning to the example of FIG. 5, device-memory read command may access the shadow memory 504, which may return the data back at line-speed. In some examples, the size of the shadow memory may be less than that of the non-volatile device storage memory 502. In these examples, the shadow memory may define a range and block size of a device memory read command that may be possible from non-volatile device storage memory. The contents of the base memory 502a may therefore be read at line speed by directly reading from its shadow in the base shadow memory 504a. And once a subset of the expanded memory 502b is loaded into the expanded shadow memory 504b, the contents of the respective subset may also be read at line speed by directly reading from the expanded shadow memory.

In one example, on power-up or reset of the remote device, the expanded shadow memory 504b may be filled with a subset including the first one or more segments in the expanded memory 502b (following the base memory 502a). To load another subset of segment(s) into the expanded shadow memory, a set segment-pointer command may be used to fill the expanded shadow memory with the other subset of segment(s), which may overwrite the prior subset in the expanded shadow memory. A segment fill time may define the time the remote device may require to fill the expanded shadow memory after receiving the appropriate set segment-pointer command. Once the expanded shadow memory is filled, it may be read at line-speed.

The device-memory write command may be used to update data in the shadow memory 504 (both base 504a and expanded 504b), which after a write start timeout time may start a write cycle back to the non-volatile device storage memory 502. In one example, the write start timeout time may start following completion of a valid write. In one example, the write start timeout time may start following completion of a valid device-memory write command. In an instance in which the write start timeout time passes without the remote device receiving another valid write command (e.g., not including the data words), the write from shadow memory to non-volatile device storage memory may begin its write cycle. In one example, data may be written to the shadow memory until all data to be written is received, and the timeout time indicates that data reception has ceased. In various examples, once the write cycle begins, an attempt to write the entire shadow memory to non-volatile device storage memory may begin. In one example, only unprotected (unlocked) locations in the non-volatile device storage memory 502 may be written, and perhaps further, only locations whose contents that have changed.

In various examples, the remote device may begin to load a subset of segments in the expanded memory 502b into the expanded shadow memory 504b after some defined delay (e.g., one word-time delay) following receipt of a set segment-pointer command. But in some examples, the set segment-pointer command may be immediately followed by a device write command the within the defined delay, the command being to write to the expanded shadow memory. In these examples, the load from the expanded memory may be suspended, and the data from the device write command may be instead written into the expanded shadow memory. Then, after the write start timeout time has expired, the shadow memory 504 may begin the write cycle to the non-volatile device storage memory 502.

The maximum write cycle time (Max WCT) to transfer data from shadow memory 504 to non-volatile device storage memory 502 may be a function of the write start timeout time (WSTT), the write page size (WPS) in words, the write page cycle time (WPCT) and the number of pages that make up the shadow memory, where:

$$\text{Max WCT}=\text{WSTT}+(\text{WPS}\times\text{WPCT}\times\text{Number Shadow Memory Pages})$$

In various examples, the write cycle time may be improved depending on the number of changed "unlocked" locations, where unchanged locations may not be written thus reducing write time. In one example, the remote device may be taken offline and be incapable of receiving commands from the network bus when the device storage memory 500 is in a write cycle (e.g., bus 104).

It is generally beneficial that memory contents be protected as much as possible from corruption, which may be accomplished in any of a number of different manners. Sophisticated data delivery protections may be mandated to ensure that data transfers are guaranteed error free, and/or other mechanisms may be implemented to reduce the risk of memory corruption. For example, memory may be read back after it is written to verify its correctness and/or check to determine if an appropriate cyclic redundancy check (CRC) written to memory matches a CRC calculated for the same memory space.

As suggested above, in various examples, protected memory locations in non-volatile device storage memory 502 or those whose contents are the same between the shadow memory 504 and non-volatile device storage memory may be skipped and thereby not written. During a write cycle, then, remote device (e.g., device interface 202) may first check a protection status of a location in the non-volatile device storage memory. In an instance in which the location is locked, remote device may skip the respective location without writing to the respective location. In an instance in which the location is unlocked, or in other examples not including a check of the protection status, the remote device may read first data from the respective location, and compare the first data in the respective location with second data in a corresponding location of shadow memory. The remote device may write the second data in shadow memory to the respective location in the non-volatile device storage memory in an instance in which the first data differs from the second data. Otherwise, the remote device may skip the respective location without writing the second data in shadow memory to the respective location in the non-volatile device storage memory in an instance in which the first data is the same as the second data. This may occur for each location in non-volatile device storage memory during the write cycle.

According to example implementations of the present disclosure, the network system 100 including its host computer or bus controller 102, a network bus 104, and one or more remote devices 106 may carry out operations such as those illustrated in FIG. 4 by various means. These means may include hardware, alone or under direction of data, program instructions, program code, computer program code, computer-readable program code, executable computer-readable program code or the like (generally "computer programs," e.g., software, firmware, etc.). As explained above, in various examples, this hardware may include an ASIC, FPGA or the like executing computer programs stored in a non-transitory computer-readable storage medium such as FIFO memory 404, table memory 406, configuration memory 408, device storage memory 410 and/or device configuration memory 412.

More generally, according to example implementations, any suitable computer program(s) may be more generally loaded onto a computer or other programmable apparatus (e.g., ASIC, FPGA) from a computer-readable storage medium (e.g., FIFO memory 404, table memory 406, configuration memory 408, device storage memory 410, device configuration memory 412) to produce a particular machine, such that the particular machine becomes a means for implementing one or more functions specified herein. The computer program(s) may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which this disclosure pertains having the benefit of the teachings presented in the foregoing description and the associated drawings. For example, example implementations of the present disclosure set forth herein may be used in lieu of or in addition to other image processing techniques such as super-resolution, post-processing image enhancement or the like. Therefore, it is to be understood that the disclosure not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
a non-volatile memory including a base memory and an expanded memory, the non-volatile memory configured to store data in a plurality of locations, wherein the plurality of locations includes locations in both the base memory and the expanded memory; and
a device interface coupled to the non-volatile memory and including a volatile shadow memory configured to store an image of the plurality of locations of the non-volatile memory in a corresponding plurality of locations of the volatile shadow memory, the volatile shadow memory including a base shadow memory configured to store an image of the base memory, an expanded shadow memory configured to store an image of only a selectable subset of the expanded memory, and the corresponding plurality of locations includes locations in both the base shadow memory and the expanded shadow memory,
wherein the device interface is couplable to a bus controller via a digital network bus, and configured to receive and respond to commands across the digital network bus from the bus controller, the commands including a write command to write data from the digital network bus,
wherein in response to the write command in which the data is first data, the device interface is configured to write the first data from the digital network bus to a base shadow location of the corresponding plurality of locations wherein the base shadow location is located in the base shadow memory, and thereafter, write the first data from the base shadow location in the base shadow memory to a base location of the plurality of locations wherein the base location is located in the base memory, and
wherein in response to the write command in which the data is second data, the device interface is configured to write the second data from the digital network bus to an expanded shadow location of the corresponding plurality of locations wherein the expanded shadow location is located in the expanded shadow memory, and thereafter, write the second data from the expanded shadow location in the expanded shadow memory to an expanded location of the plurality of locations wherein the expanded location is located in the expanded memory.

2. The apparatus of claim 1, wherein the device interface is configured to perform the write of the first data from the base shadow location in the base shadow memory in the volatile shadow memory to the base location in the base memory in the non-volatile memory only after passage of a timeout time without receipt of another write command, and
wherein the device interface is configured to perform the write of the second data from the expanded shadow location in the expanded shadow memory in the volatile shadow memory to the expanded location in the expanded memory in the non-volatile memory only after passage of a timeout time without receipt of another write command.

3. The apparatus of claim 1, wherein the device interface is configured to check a protected or unprotected status of both the base location in the base memory and the expanded location in the expanded memory, the device interface being configured to perform the write of the first data from the base shadow location in the base shadow memory to the base location in the base memory in the non-volatile memory only in an instance in which the base location in the base memory is an unprotected location, and the device interface being configured to perform the write of the second data from the expanded shadow location in the expanded shadow memory to the expanded location in the expanded memory in the non-volatile memory only in an instance in which the expanded location in the expanded memory is an unprotected location.

4. The apparatus of claim 3,
wherein the device interface is configured to read first unprotected data front the base location in the base memory wherein the base location in the base memory is unprotected, compare the first unprotected data with the first data, and perform the write of the first data from the base shadow location in the base shadow memory in the volatile shadow memory to the base location in the base memory in the non-volatile memory only in an instance in which the first unprotected data differs from the first data written to the base shadow location in the base shadow memory in the volatile shadow memory, and
wherein the device interface is configured to read second unprotected data from the expanded location in the expanded memory wherein the expanded location in the expanded memory is unprotected, compare the second unprotected data with the second data, and perform the write of the second data from the expanded shadow location in the expanded shadow memory in the volatile shadow memory to the expanded location in the expanded memory in the non-volatile memory only in an instance in which the second unprotected data differs from the second data written to the expanded shadow location in the expanded shadow memory in the volatile shadow memory.

5. The apparatus of claim 3, wherein the device interface is configured to:
(i) check a protected or unprotected status of a location in the base memory wherein the location in the base memory is part of the plurality of locations, and in response to the location in the base memory is unprotected, write data from a location in the base shadow memory to the location in the base memory when data in the location in the base memory differs from the data in the location in the base shadow memory, wherein the location in the base shadow memory is part of the corresponding plurality of locations, (ii) check a protected or unprotected status of a location in the expanded memory wherein the location in the expanded memory is unprotected, write data from a location in the expanded shadow memory to the location in the expanded memory when data in the location in the expanded memory differs from the data in the location in the expanded shadow memory, wherein the location in the expanded shadow memory is part of the corresponding plurality of locations, and repeat steps (i) and (ii) for each of the plurality of locations of the non-volatile memory for which the image of the plurality of locations of the non-volatile memory is stored in the corresponding plurality of locations of the volatile memory.

6. The apparatus of claim 1, wherein the device interface is configured to read first unprotected data from the base location in the base memory wherein the base location in the base memory is unprotected, compare the first unprotected data with the first data, and perform the write of the first data from the base shadow location in the base shadow memory in the volatile shadow memory to the base location in the base memory in the non-volatile memory only in an instance in which the first unprotected data differs from the first data written to the base shadow location in the base shadow memory in the volatile shadow memory, and wherein the device interface is configured to read second unprotected data from the expanded location in the expanded memory wherein the expanded location in the expanded memory is unprotected, compare the second unprotected data with the second data, and perform the write of the second data from the expanded shadow location in the expanded shadow memory in the volatile shadow memory to the expanded location in the expanded memory in the non-volatile memory only in an instance in which the second unprotected data differs from the second data written to the expanded shadow location in the expanded shadow memory in the volatile shadow memory.

7. The apparatus of claim 6, wherein the device interface is configured to: (i) check protected or unprotected status of a location in the base memory wherein the location in the base memory is part of the plurality of locations, and in response to the location in the base memory is unprotected, write data from a location in the base shadow memory to the location in the base memory when data in the location in the base memory differs from the data in the location in the base shadow memory, wherein the location in the base shadow memory is part of the corresponding plurality of locations, (ii) check protected or unprotected status of a location in the expanded memory wherein the location in the expanded memory is part of the plurality of locations, and in response to the location in the expanded memory is unprotected, write data from a location in the expanded shadow memory to the location in the expanded memory when data in the location in the expanded memory differs from the data in the location in the expanded shadow memory, wherein the location in the expanded shadow memory is part of the corresponding plurality of locations, and repeat steps (i) and (ii) for each of the plurality of locations of the non-volatile memory for which the image of the plurality of locations of the non-volatile memory is stored in the corresponding plurality of locations of the volatile memory.

\* \* \* \* \*

UNITED STATES PATENT AND TRADEMARK OFFICE
CERTIFICATE OF CORRECTION

PATENT NO. : 10,089,224 B2
APPLICATION NO. : 13/835191
DATED : October 2, 2018
INVENTOR(S) : Philip J. Ellerbrock et al.

Page 1 of 1

It is certified that error appears in the above-identified patent and that said Letters Patent is hereby corrected as shown below:

In the Claims

In Column 20, Claim 4, Line 34, "unprotected data front the base" should read -- unprotected data from the base --

In Column 21, Claim 5, Line 5, "expanded memory is unprotected" should read -- expanded memory is part of the plurality of locations, and in response to the location in the expanded memory is unprotected --

Signed and Sealed this
Fifteenth Day of January, 2019

Andrei Iancu
*Director of the United States Patent and Trademark Office*